United States Patent [19]
Graham

[11] 3,942,074
[45] Mar. 2, 1976

[54] STATIC OVERCURRENT RELAY

[75] Inventor: Daniel J. Graham, Marlton, N.J.

[73] Assignee: General Electric Company, Philadelphia, Pa.

[22] Filed: Sept. 27, 1974

[21] Appl. No.: 509,879

[52] U.S. Cl. .......... 317/36 TD; 317/33 SC; 317/22; 317/13 B
[51] Int. Cl.² ...................... H02H 3/08; H02H 7/06
[58] Field of Search.......... 317/36 TD, 33 R, 33 SC, 317/141 S, 22, 13 R, 13 B; 340/173; 307/293, 229, 230

[56] References Cited
UNITED STATES PATENTS

| | | | |
|---|---|---|---|
| 2,897,407 | 7/1959 | Morris | 317/47 |
| 3,154,737 | 10/1964 | Hodges | 317/47 X |
| 3,317,794 | 5/1967 | Kotheimer | 317/36 TD |
| 3,531,689 | 9/1970 | Horn | 317/33 R X |
| 3,662,220 | 5/1972 | Riebs | 317/36 TD |
| 3,808,503 | 4/1974 | Hentschel | 317/27 |
| 3,849,706 | 11/1974 | Johnson et al. | 317/36 TD X |

OTHER PUBLICATIONS

"Negative Sequence Current Protection – ", by Hossbo et al., pp. 197–198, Asea Journal, 1971, Vol. 44, No. 6.

Primary Examiner—J. D. Miller
Assistant Examiner—Patrick R. Salce
Attorney, Agent, or Firm—Joseph H. Yamaoka; J. Wesley Haubner

[57] ABSTRACT

A solid state protective device is disclosed which protects electrical apparatus from heat damage due to overcurrents, particularly one which protects electrical generators from damage caused by heat due to excessive negative phase sequence currents. The device includes a novel reset feature such that the time required for the device to take protective action after an overcurrent is detected is reduced by a period of time which is a linear function of the heat remaining in the protected apparatus due to any prior overcurrents.

11 Claims, 1 Drawing Figure

U.S. Patent   March 2, 1976   3,942,074
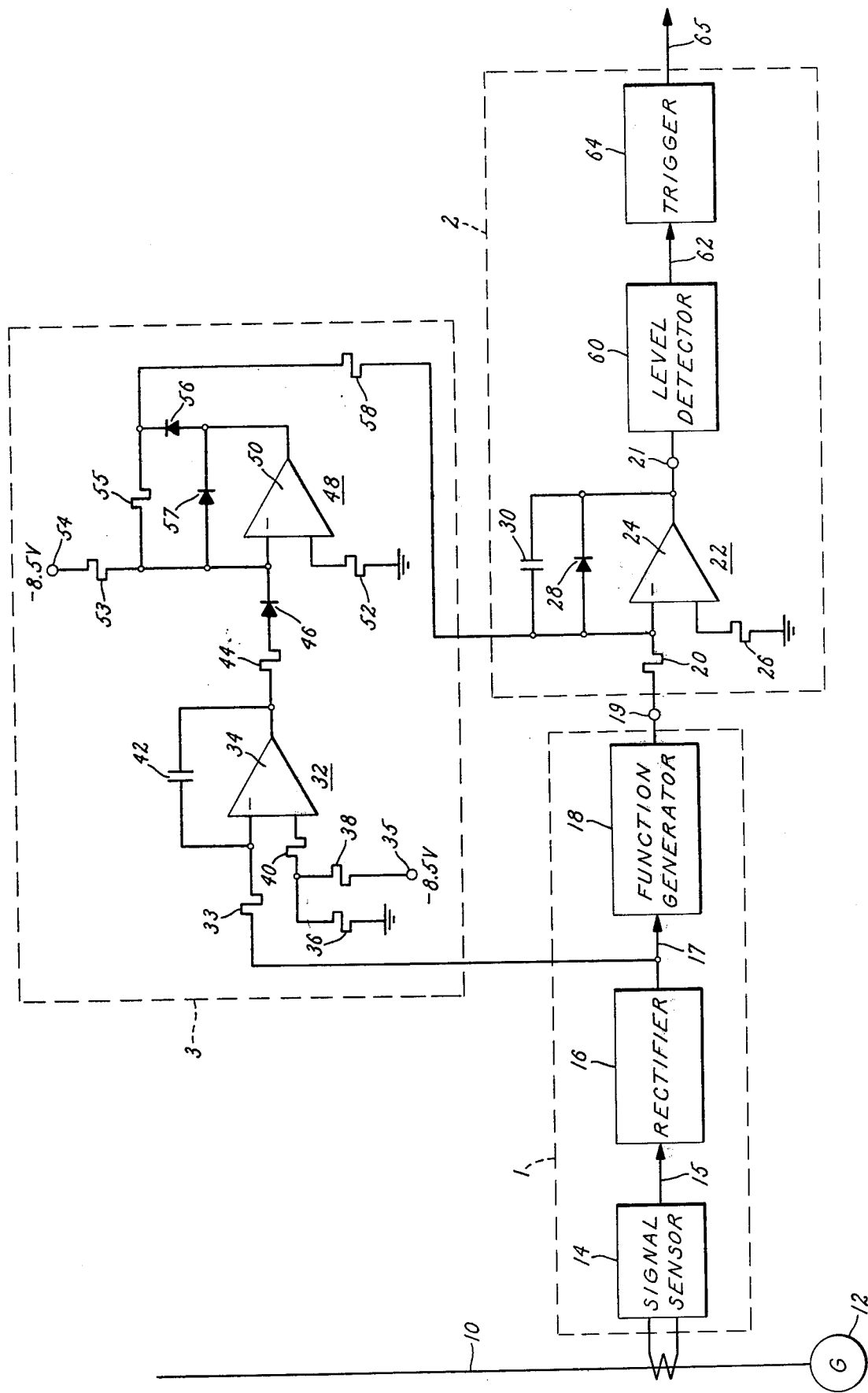

STATIC OVERCURRENT RELAY

This invention relates to the protection of electrical apparatus from dangerous overcurrents and thermal damage caused thereby, and, more particularly, it relates to relays which provide this protection using solid state components.

Generally, inverse-time overcurrent protective relays respond to the magnitude of a circuit quantity such as alternating current or its negative phase sequence component, for example, becoming excessive. It is generally desirable that such a relay be designed to have an operating characteristic such that the time required for the relay to operate varies inversely with the magnitude of the current being monitored or with some power thereof. In many applications it is also desirable that the relay quickly reset after the overcurrent subsides in order that it be in a position to freshly respond to any subsequent overcurrents. However, if the relay is used to protect electrical apparatus having thermal inertia, it may be desirable that there be a delay in the reset action while any heat stored in the apparatus is dissipating. In other words, once the relay has responded and the overcurrent causing this response subsides, the amount of time required for the relay to take protective action for any subsequent overcurrents must be decreased by an amount proportional to the heat remaining in the apparatus.

One particular application in which delayed reset is desired is in the protection of three-phase AC electric power generators from unbalanced phase currents. In this case, the negative phase sequence component ($I_2$) of current in the stator of the machine sets up a counter-rotating flux field which causes double-frequency currents to flow in the rotor iron and slot wedges, thereby overheating the rotor. The capability of machines to withstand the heating caused by unbalanced stator currents in exces of predetermined permissible values has been expresed by the following relationship: $I_2^2 t = K$ where $t$ is the duration of the unbalanced condition and $K$ is a constant. An improved static relay using solid-state components and having an $I_2^2 t = K$ operational characteristic has been developed to furnish the desired protection. In this relay, a symmetrical component segregating network derives a voltage signal proportional to the negative phase sequence current in the stator windings of the protected generator, and this signal is rectified and applied to the input of a non-linear function generator which produces an output signal, the magnitude of which varies approximately with the square of the input signal. If the negative phase sequence current increases above a predetermined pick-up level, the output voltage of the function generator is integrated, and after a delay determined by the time required for the integrated voltage to reach a preset reference level, a trigger circuit is energized causing the required protective action to be effected (e.g., a circuit breaker is opened or an alarm is sounded). This relay is described and claimed in my copending application Ser. No. 504,785, filed Sept. 10, 1974, which is assigned to the assignee of the present invention.

Others have heretofore suggested that the reset action of overcurrent relays be delayed for various reasons. In some prior art disclosures of static overcurrent relays, a reset delay is inherently obtained because of the connection of a leakage resistor in parallel relationship with the timing capacitor of the relay. When an overcurrent subsides, the capacitor proceeds to discharge through the parallel resistor (see U.S. Pat. No. 3,413,496-Baude and British Pat. No. 617,417). In these prior art devices the rate of capacitor discharge is non-linear or exponential which is undesirable for certain applications.

Accordingly, it is an object of my invention to provide an improved static overcurrent relay having a linear reset characteristic which matches an approximately linear cooling curve of the electrical apparatus to be protected.

In carrying out my invention in one form I modify the relay previously described by providing a control means for activating its integrator as soon as a miniumum overcurrent condition is reached and for later delaying the resetting action of the integrator whenever the current subsides below the minimum overcurrent level. The reset control means includes a source of constant current for discharging, at a linear rate, the energy storage element (usually a capacitor) which comprises the integrator of the relay. If a second overcurrent condition were to occur while the delayed resetting action is still in progress, the integrating action will resume with a residual charge on the energy storage element, whereby a relatively shorter time is required for the integrated voltage to reach the same reference level at which the trigger circuit is energized. Thus in the protection of generators from negative phase sequence overcurrents, if one unbalanced current condition occurs and then subsides, my relay will operate more quickly in response to any subsequent unbalanced condition occuring before the machine rotor has recovered to its normal temperature. The resetting action of my relay is designed to approximate the cooling curve of the generator rotor which in this case has been estimated to be a linear function of time, and consequently the decrease in the operating time for a subsequent overcurrent will be proportional to heat remaining in the rotor.

This invention will be more fully understood and its various objects and advantages will be more fully appreciated from the following description taken in conjunction with the accompanying drawing, the single FIGURE of which is a schematic circuit diagram of a relay embodying a preferred form of the present invention.

Referring now to the drawing, a relay embodying my invention is seen to comprise a combination of three basic "building blocks": condition responsive means 1, an electric energy accumulator 2, and control means 3. The condition responsive means 1 is coupled to a single line 10, which represents a three-phase a-c electric power circuit emanating from a protected generator 12, in order to derive from this circuit an input signal representative of the heating effect which a current in the circuit has on the generator 12. It will be apparent to those skilled in the art that other types of electrical apparatus (e.g., motors, transformers or the like) requiring protection from heat damage could also be protected by use of my relay.

The means 1 of my relay includes more specifically a signal sensor 14 which is coupled to the line 10 and which typically comprises a symmetrical component segregating network capable of producing a voltage proportional to the negative phase sequence current in the stator windings of the protected generator. Such networks are well known in the art (see for example, U.S. Pat. Nos. 2,897,407—Morris and 3,154,737—Hodges). The alternating voltage output signal 15 of signal sensor 14, after first being passed through a bandpass filter (not shown) to reject unwanted harmonics, is rectified by suitable rectification means 16 to provide a unipolar voltage input signal 17 of variable amplitude and of negative polarity with respect to a common potential bus (shown as ground). Thus signal 17 is a train of undulating half cycles the amplitude of which is proportional to the negative phase sequence current. It is applied to the inverting input of a suitable non-linear function generator 18. In the illustrated embodiment of my invention, the function generator 18 approximates a squaring function and produces at a terminal 19 a relatively negative modified input signal which is proportional in magnitude to approximately the square of the signal 17. The preferred embodiment of such a function generator is more fully described in my copending application mentioned above.

The modified input signal derived by the condition responsive means 1 is supplied to the input terminal 19 of the accumulator 2 which is operative to change from a normal quiescent state to a trip state at a rate determined by its input signal, whereby the operating time of the accumulator will vary inversely with the square of the signal 17 and thus with the heating effect of the negative phase sequence current in the circuit 10. As it is shown in the drawing, the accumulator preferably includes integrating means 22, a level detector 60, and a trigger circuit 64. The illustrated integrating means 22 is comprised of an operational amplifier 24 whose non-inverting input is connected to the common potential bus by resistor 26 and whose inverting input is connected to the input terminal 19 by a resistor 20. Operational amplifier 24 has a feedback path between output terminal 21 and its inverting input consisting of two parallel branches, the first containing diode 28 and the second containing capacitor 30. Integrating means 22 is normally reset, in which state the charge on capacitor 30 has a quiescent magnitude near zero volts which is determined by the forward drop of diode 28. This quiescent state is maintained by the action of the associated control means 3 which will next be described.

The control means 3 comprises a pick-up control circuit 32 in combination with a reset control circuit 48. As is indicated in the drawing, the aforesaid input signal 17 in addition to being supplied to the function generator 18 is also supplied to an input resistor 33 of the pick-up control circuit 32. Pick-up control circuit 32 will keep the integrator 22 inoperative until the negative phase sequence current exceeds a predetermined critical pick-up level. The illustrated pick-up control circuit 32 is comprised of an operational amplifier 34 whose inverting input is connected to resistor 33 and whose non-inverting input is connected to a suitable negative voltage source 35 by resistors 36, 38 and 40. This operational amplifier has a feed-back path containing capacitor 42. The output of pick-up control circuit 32 is supplied through a resistor 44 and a diode 46 to the reset control circuit 48.

Preferably the reset control circuit 48 consists of an operational amplifier 50 whose non-inverting input is connected to common by resistor 52 and whose inverting input is connected to pick-up control circuit 32 via the resistor 44 and the diode 46 and to a suitable negative voltage source 54 by a resistor 53. Operational amplifier 50 has a feed-back path between its output terminal and its inverting input terminal consisting of a first branch containing resistor 55 in series with diode 56 and a second parallel branch containing diode 57. Diodes 56 and 57 are poled as shown. The output of reset control circuit 48 is supplied via resistor 58 to the inverting input of operational amplifier 24 of the integrating means 22.

The operation of pick-up and reset control circuits 32 and 48 of the control means 3 will now be summarized. Negative voltage source 35 produces at the non-inverting input of operational amplifier 34 a small reference signal whose magnitude depends on the values of resistances 36, 38, and 40. So long as the average magnitude of the input signal 17 applied to the same amplifier is less than a pick-up level established by this reference signal, the output of pick-up control circuit 32 will be negative with respect to ground and the diode 46 will block since its cathode potential is fixed at virtual ground. Under these conditions, the total current at the inverting input of operational amplifier 50 will flow through resistor 53 to the negative terminal 54, the output of reset control circuit 48 will be positive, the diode 57 will block, and the diode 56 will conduct. Since the output of reset control circuit 48 is now a fixed position value and since the inverting input of operational 24 is always at virtual ground, a constant current will flow through resistor 58. This current may be expressed by the relationship $I = V/R_{58}$, where $V$ is the output voltage of the reset control circuit 48 (e.g., + 0.2 volts) and $R_{58}$ is the ohmic value of resistor 58 (e.g., 1 megohm). Under steady state reset conditions, this positive current forward biases diode 28, thus preventing charge from accumulating on the capacitor 30 and keeping integrating means 22 inoperative. Thus, the output voltage developed at terminal 21 is normally a slightly negative quiescent magnitude equal to the forward drop of diode 28, as mentioned above.

If negative phase sequence current increases to a value at which the input signal 17 exceeds the pick-up level, the output of pick-up control circuit 32 will become positive, diode 46 will be forward biased, and there will be a net flow of current into the inverting input of the operational amplifier 50. When this occurs the output of amplifier 50 will be slightly negative with respect to ground, diode 56 will block, and no current will flow through either resistor 55 or resistor 58. Under these conditions the magnitude of the output voltage of the operational amplifier 24 can increase with time in a positive sense with respect to ground, the capacitor 30 begins to charge, and the integrator 22 is enabled to integrate the modified input signal which is produced at terminal 19.

Whenever the input signal 17 subsequently subsides below a predetermined level which ordinarily is the same as the pick-up level, the output of the reset control circuit 48 becomes positive again and the capacitor 30 begins to discharge. The only discharge current path is through resistor 58, and since the inverting input of operational amplifier 24 remains at virtual ground the magnitude of this discharge current is the same as was flowing through resistor 58 prior to pick-up. Since the discharge current is of a constant magnitude, the value of which is determined by the output voltage of reset control circuit 48 and the ohmic value of resistor 58, proper selection of these parameters will provide a desired linear rate of discharge of capacitor 30. In this manner the accumulator 2 is returned to its quiescent state at a substantially linear rate. This linear reset rate is selected to correspond to the cooling rate of the protected generator 12. If the input signal again increases above its pick-up level prior to the voltage output of integrator 22 reaching its quiescent magnitude, the resetting action will terminate, and the residual charge then remaining on capacitor 30 will be proportional to the heat remaining in the protected generator.

In the accumulator 2, the output voltage of integrator 22 is monitored by the level detector 60, and when this voltage has increased to a predetermined magnitude a trip signal 62 will be emitted which causes the trigger circuit 64 to produce an appropriate response signal 65 which may be used to open a circuit breaker or activate an alarm or warning device (not shown). This is the aforesaid "trip state" of the accumulator 2, and the rate at which it is attained varies with the average magnitude of the signal at the input terminal 19.

It will be apparent that the delayed reset feature of my invention is useful in static overcurrent relays having condition responsive means and accumulators whose circuit details are different than those used in the presently preferred embodiment of the invention. By way of example, the means 1 could derive an input signal comprising a train of intermittent pulses whose frequency and amplitude both vary with current, as is taught in U.S. Pat. No. 3,317,794—Kotheimer, or a train of constant-frequency triangular pulses whose base and amplitude vary with current, as is taught in reissue U.S. Pat. No. Re. 25,762—Kotheimer. If the input signal were a pulse train whose frequency varies with the square of current (see U.S. Pat. No. 3,262,017), the accumulator 2 could be either an analog RC integrator as shown or a digital counter as is suggested in U.S. Pat. No. 3,018,416.

While I have shown and described one form of my invention, modifications will surely occur to those skilled in the art. For example, the quiescent magnitude of the voltage across the integrating capacitor can be selected to be that voltage at which the capacitor is fully charged, and the level detector could be designed to be activated at a predetermined low magnitude of the integrator ouput voltage (e.g., near zero volts). In this case the relay would be reset by a constant charging current, rather than by a constant discharging current. It is contemplated therefore, by the claims which conclude this specification to cover this and other such modifications as fall within the true spirit and scope of the invention.

What I claim as new and desire to secure by Letters Patent of the United States is:

1. A protective relay adapted to be coupled to an electric current circuit including electrical apparatus in order to protect said apparatus from overheating comprising:
    a. means for deriving from said circuit an input signal representative of the heating effect which a current in said circuit has on said apparatus;
    b. normally reset integrating means having an input terminal to which said input signal is suplied and an output terminal at which is developed an output signal having a magnitude that increases with time when the integrating means is operative;
    c. control means for enabling said integrating means to operate whenever the magnitude of said current exceeds a predetermined pick-up level, and for resetting said integrating means in delayed response to said current subsiding below said pick-up level, the time delay resetting action reducing said output signal at a predetermined substantially linear rate toward a quiescent magnitude near zero; and, thereby approximating the cooling characteristic of said electrical apparatus
    d. means connected to said integrating means capable of producing a trip signal when said output signal exceeds a preselected magnitude.

2. A protective relay as defined in claim 1 in which said integrating means comprises a capacitor, the charge on which determines the magnitude of said output signal, and in which said control means comprises a discharge path including a constant current source effective whenever said resetting action occurs to remove said charge from said capacitor at said substantially linear rate.

3. A protective relay as defined in claim 1 in which said linear rate corresponds to the cooling rate of the apparatus being protected.

4. A protective relay as defined in claim 3 in which said electrical apparatus comprises a generator and said current is a negative phase sequence current.

5. A protective relay as defined in claim 1 in which the resetting action of said control means is terminated in the event said current again exceeds said pick-up level prior to said output signal being reduced to its quiescent magnitude.

6. A protective relay as defined in claim 1 in which said integrating means comprises a first operational amplifier across which is connected a feed-back loop capacitor.

7. A protective relay as defined in claim 6 in which said control means comprises second and third operational amplifiers connected in series with one another, said third operational amplifier being connected to said feed-back loop capacitor.

8. A protective relay as defined in claim 1 in which the magnitude of said input signal varies as a non-linear function of said current.

9. A protective relay adapted to be coupled to a polyphase a-c circuit including electrical apparatus in order to protect said apparatus from overheating comprising:
    a. means for deriving from said circuit an electric input signal representative of the heating effect which a current in said circuit has on said apparatus;
    b. an accumulator having a quiescent state and a trip state, said accumulator being supplied with said input signal and being operative to change from said quiescent state to said trip state at a rate determined by said input signal, whereby the operating time of said accumlator varies inversely with the heating effect of said current; and
    c. control means responsive to said current exceeding a predetermined pick-up level for enabling said accumulator to operate and responsive to said current subsiding below said pick-up level for returning said accumulator to said quiescent state at a substantially time delayed linear rate thereby approximating the cooling characteristic of said electrical apparatus.

10. A protective relay as defined in claim 9 in which said accumulator comprises a capacitor the charge on which increases with time whenever the accumulator is operative, said accumulator being in its quiescent state whenever the charge on said capacitor is near zero and attaining its trip state when said charge increases to a preselected level.

11. A protective relay as defined in claim 10 in which said control means is effective in response to said current subsiding below said pick-up level for discharging said capacitor at said substantially linear rate.

* * * * *